United States Patent
Tarrant

(10) Patent No.: US 10,377,405 B2
(45) Date of Patent: Aug. 13, 2019

(54) SCAFFOLD STORAGE AND TRANSPORTATION DOLLY SET

(71) Applicant: Patrick M. Tarrant, New York, NY (US)

(72) Inventor: Patrick M. Tarrant, New York, NY (US)

( * ) Notice: Subject to any disclaimer, the term of this patent is extended or adjusted under 35 U.S.C. 154(b) by 0 days.

(21) Appl. No.: 15/947,417

(22) Filed: Apr. 6, 2018

(65) Prior Publication Data

US 2018/0222512 A1 Aug. 9, 2018

Related U.S. Application Data

(63) Continuation of application No. 15/240,051, filed on Aug. 18, 2016, now Pat. No. 9,969,416.

(51) Int. Cl.
*B62B 5/00* (2006.01)
*B62B 1/26* (2006.01)
*B62B 1/00* (2006.01)
*E04G 5/00* (2006.01)
*B62B 3/10* (2006.01)

(52) U.S. Cl.
CPC ............ *B62B 5/0086* (2013.01); *B62B 1/008* (2013.01); *B62B 1/262* (2013.01); *E04G 5/004* (2013.01); *B62B 3/102* (2013.01)

(58) Field of Classification Search
CPC ........ B62B 5/0086; B62B 1/262; E04G 5/004
USPC .................. 280/63, 79.6, 79.7, 47.19, 47.35; 414/746.8
See application file for complete search history.

(56) References Cited

U.S. PATENT DOCUMENTS

| | | | | |
|---|---|---|---|---|
| 3,021,011 A | * | 2/1962 | Visneski | B62B 3/04 108/55.3 |
| 4,630,838 A | * | 12/1986 | Stockton | B62B 3/108 280/47.17 |
| 4,863,179 A | * | 9/1989 | Isaacs | B60D 1/00 280/33.996 |
| 5,005,846 A | * | 4/1991 | Taylor | B60P 3/062 114/344 |
| 5,244,221 A | * | 9/1993 | Ward | B62B 1/002 269/17 |
| D340,337 S | * | 10/1993 | Beasley | 280/79.7 |
| 5,860,627 A | | 1/1999 | Edwards | |

(Continued)

FOREIGN PATENT DOCUMENTS

| | | | | |
|---|---|---|---|---|
| EP | 332060 | * | 9/1989 | E04G 5/004 |
| FR | 2285308 | | 4/1976 | |

*Primary Examiner* — Michael Safavi
(74) *Attorney, Agent, or Firm* — Richard Malagiere, Esq.

(57) ABSTRACT

A pair of dollies for storing and transporting scaffold frames is disclosed. Each dolly is made up of two identical dolly members containing a top plate, bottom plate, two side plates and a front and back plate. Communicating holes are inserted along the length of the top and bottom plates. The side plates of each dolly member has semi-circular cut outs on the top edges which correspond with the holes in the top and bottom plates. The end holes at the front and back of each dolly member have tubes permanently inserted to receive a typical scaffold 8 inch swivel caster wheel with brake. Scaffold frame legs are inserted into the remaining holes in the top and bottom plates of the dollies. The bottom cross member of each scaffold frame sits on the semi-circular cut outs on the top edges of the side plates. This device can be used for storage or transportation of scaffold frames.

5 Claims, 6 Drawing Sheets

(56) References Cited

U.S. PATENT DOCUMENTS

| | | | | |
|---|---|---|---|---|
| 5,879,014 A * | 3/1999 | Price | | B62B 3/02 280/47.18 |
| 5,903,956 A * | 5/1999 | Theising | | B60B 33/06 16/19 |
| 6,036,219 A * | 3/2000 | Oefelein | | B62B 3/02 280/35 |
| 6,079,931 A * | 6/2000 | English, Jr. | | A47B 91/002 254/8 R |
| 6,302,414 B1 * | 10/2001 | Berthiaume | | B62B 1/002 280/47.18 |
| 6,394,470 B1 * | 5/2002 | Shirai | | B62B 3/184 280/33.996 |
| 6,964,423 B1 * | 11/2005 | Chieh | | B62B 5/0083 248/129 |
| 7,270,339 B2 * | 9/2007 | Feick | | A47F 5/137 211/186 |
| 7,490,839 B2 * | 2/2009 | Perelli | | B25H 3/00 280/47.35 |
| 8,590,921 B2 * | 11/2013 | Benson | | B62B 3/008 182/123 |
| 2001/0013690 A1 * | 8/2001 | Sexton | | B62B 3/108 280/79.7 |
| 2002/0158435 A1 * | 10/2002 | Hill | | B62B 3/108 280/47.35 |
| 2003/0030239 A1 * | 2/2003 | Woerner | | B62B 3/002 280/47.35 |
| 2006/0197298 A1 * | 9/2006 | Shore | | B62B 3/108 280/79.7 |
| 2007/0029747 A1 * | 2/2007 | Islo | | B60F 3/0069 280/47.35 |
| 2007/0235968 A1 * | 10/2007 | Krizan | | B62B 3/108 280/79.7 |
| 2008/0054580 A1 * | 3/2008 | Glaser | | B62B 5/0083 280/35 |
| 2008/0191436 A1 * | 8/2008 | Galgano | | B62B 1/14 280/47.11 |
| 2010/0237577 A1 * | 9/2010 | Bolster | | B62B 3/0643 280/79.7 |
| 2010/0310346 A1 * | 12/2010 | Polidoros | | B62B 3/04 414/523 |
| 2011/0084459 A1 * | 4/2011 | Hergeth | | B62B 3/04 280/47.35 |
| 2011/0297905 A1 * | 12/2011 | Arensdorf | | B62B 5/0086 254/8 R |
| 2012/0222913 A1 | 9/2012 | Calvert | | |
| 2017/0282778 A1 * | 10/2017 | Young, Jr. | | B60P 1/6409 |

* cited by examiner

SCAFFOLD STORAGE AND TRANSPORTATION DOLLY SET

This application claims priority is a continuation of U.S. nonprovisional application Ser. No. 15/240,051 filed Aug. 18, 2016.

BACKGROUND OF INVENTION

The present invention is directed to a dolly for the storage and transportation of scaffold frames made up of two separate dolly units. Each dolly unit is comprised of a member with top, bottom, side and front and back plates. Holes are spaced evenly along the top and bottom plates. The side plates protrude above the plane of the top plate and have scalloped cut outs which correspond to the holes spaced evenly along the top and bottom plates of the member.

The left side scaffold frame unit leg is inserted into the holes on the top and bottom plates of the left dolly member and the scaffold unit cross member sits in the scalloped cut outs on the side plate of that member. The right side scaffold frame unit leg is inserted into the corresponding holes on the top and bottom plates of the right dolly member and the scaffold unit cross member sits on the scalloped cut outs on the side plate of the member. This procedure is repeated with the placement of additional scaffold frames until all of the holes on the top and bottom plates, except the holes at the front and back of the plate, are occupied with scaffold frames. The top and bottom plate holes located at the ends (front and back) of the dolly members are occupied by swivel-mounted wheels which are employed by the scaffold system when erected.

A good deal of the prior art in the area of storing and moving items is in the form of frames with cross members and caster wheels on all four corners where multiple items like tables, beds, etc. are places and moved or stored. This prior art is distinguishable from the present invention because the present invention utilizes two separate dolly devices connected by the items (in the case of the present invention scaffold frames) to be moved or stored.

Other prior art discloses the use of two dollies where the load carried acts as the connecting means between the dollies. However, none of this prior art teaches the use of attachments associated with the items being moved (here the scaffold caster wheels and scaffold base plates) as being employed in the storage/moving device as set forth in the present invention. Further, none of the prior art, other than Hershberger U.S. Pat. No. 5,037,117, teaches storing or moving many of the same items. Hershberger, however teaches a locking arm, and stabilizer bars. The present invention does not employ any such stabilizing bars or locking bars.

SUMMARY OF INVENTION

A pair of scaffold dolly members each comprising an elongate rectangular member made up of a top plate, bottom plate, two side plates, front and back plates and a front end and a back end, the side plates adapted to attach to the bottom and top plates and rising above the top plate with a plurality of communicating semi-circular cut outs along the top edges of the side plates, the bottom and top plates having a plurality of communicating holes distributed along the length of the bottom and top plates, the plurality of communicating holes along the length of the bottom and top plates corresponding to the plurality of communicating semi-circular cut outs along the top edges of the side plates, receiver tubes protruding from the front end and back end bottom plate holes and passing through the communicating front end and back end top plate holes adapted to adjustably receive swivel mounted wheels and swivel mounted wheels adjustably inserted into the receiver tubes.

DRAWINGS

DETAILED DESCRIPTION OF INVENTION

Figure 1:
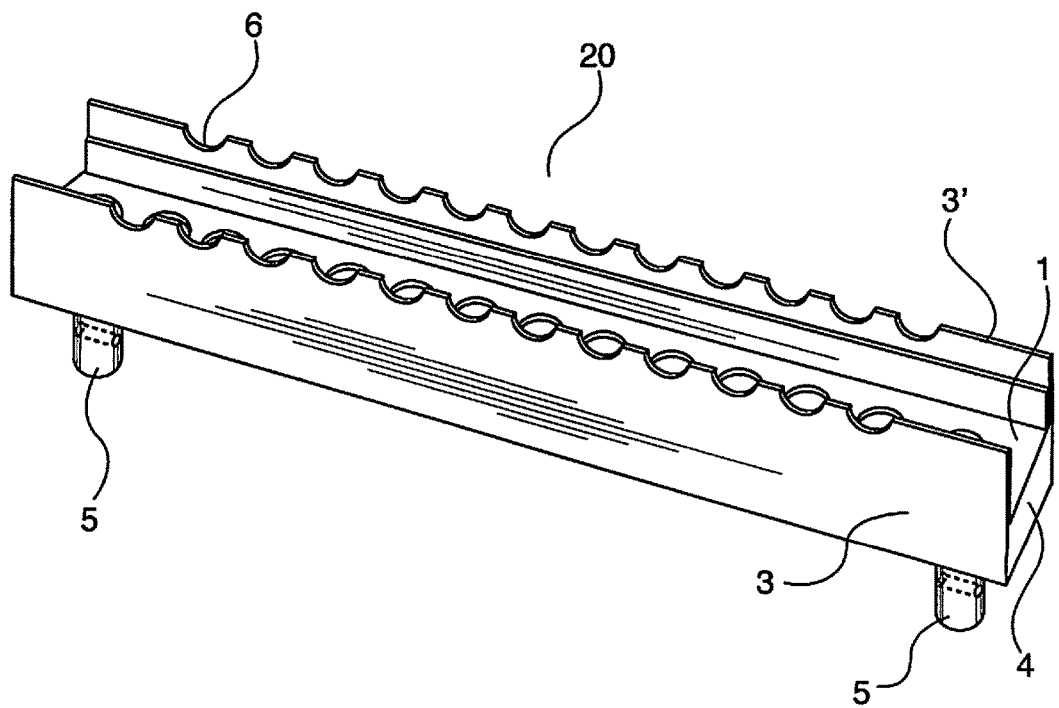
FIG. 1 is an isometric view of one dolly unit of the present invention.

The present invention will now be described in terms of the presently preferred embodiment thereof as illustrated in the drawings. Those of ordinary skill in the art will recognize that many obvious modifications may be made thereto without departing from the spirit or scope of the present invention.

Scaffolding is typically used on the outside or inside of buildings or structures to allow workers to perform construction or maintenance tasks at an elevation above ground level. Scaffolding, when erected, normally consists of prefabricated steel vertical frames where the base of one frame is inserted into the top of the fame below it and so on. Diagonal bracing is then inserted to provide lateral support to the erected vertical steel frames.

The prefabricated steel vertical frames are typically 5 feet wide by 6 feet in height. The frames are typically carried one-by-one by a laborer. First, the laborer carries one scaffold frame at a time from the storage facility and loads it onto a truck for transportation of the scaffolding to the construction project site. Once the truck is loaded, the scaffolding is transported to the construction site and unloaded one prefabricated frame at a time to the specific location where the scaffolding is needed and assembled for use. Frequently, the scaffolding is placed in hoists and transported to the specific floor of a building where it is needed. In this instance, often encountered with high-rise construction, the scaffold is moved yet another time and loaded into a hoist and moved off of the hoist to the specific location on the floor of the building where it is needed. Of course, all of these steps are repeated once the task is completed and the scaffolding is removed from the construction job site.

Moving scaffold frames is time consuming and labor intensive. These realties contribute to two of the biggest maladies associated with modern construction projects—delays and labor cost overruns. The present invention is designed to address these issues and provide a device which will create efficiencies and thereby reduce the labor cost impact and delay associated with the current practice of moving scaffold frames one at a time.

Figure 2:
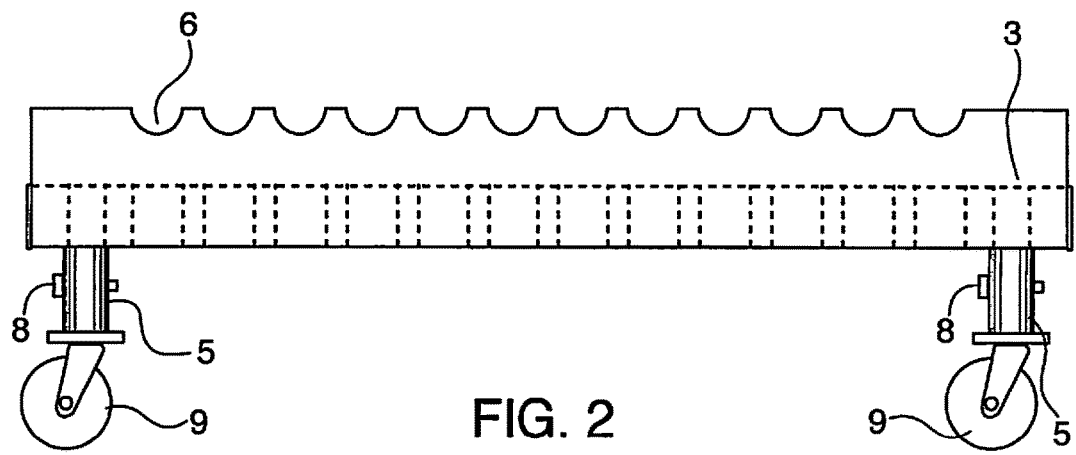
FIG. 2 is a typical side view of one dolly unit of the present invention.
Figure 3:
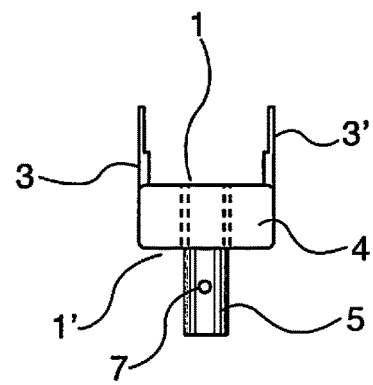
FIG. 3 is a typical front and rear view of one dolly unit of the present invention.
Figure 4:
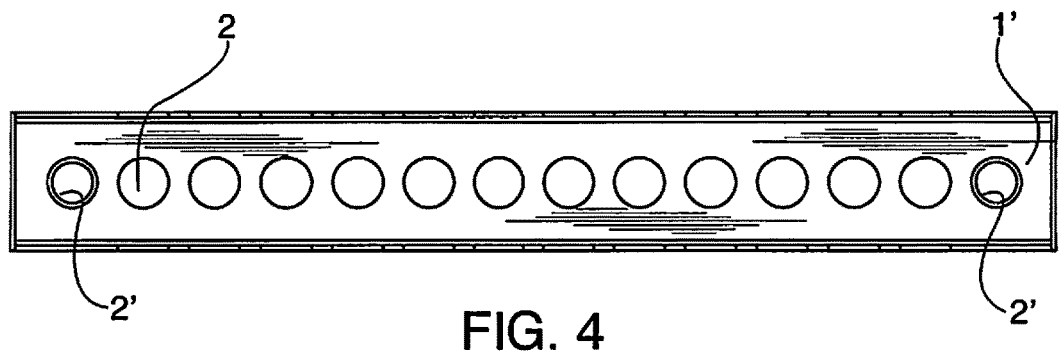
FIG. 4 is a bottom view of one dolly unit of the present invention.

In one preferred embodiment of the present invention, a dolly system for the storage and transportation of scaffold frames made up of two separate dolly units is disclosed. FIG. 1. Each dolly unit is comprised of a dolly with top plate 1 and bottom plate 1' with evenly spaced communicating holes 2 along the top and bottom plates. FIG. 1 and FIG. 4. The dolly unit side plates 3 and 3' attach to the top 1 and bottom 1' plates and maintain the plates 1 and 1' in a parallel configuration. FIG. 3. The side plates, 3 and 3', extend above top plate 1 and have communicating semi-circle cut outs 6 inserted along their top edges. FIG. 1 and FIG. 2. These communicating semi-circle cut outs 6 also correspond to the communicating holes 2 in the top 1 and bottom 1' plates. FIG. 2.

Figure 10:
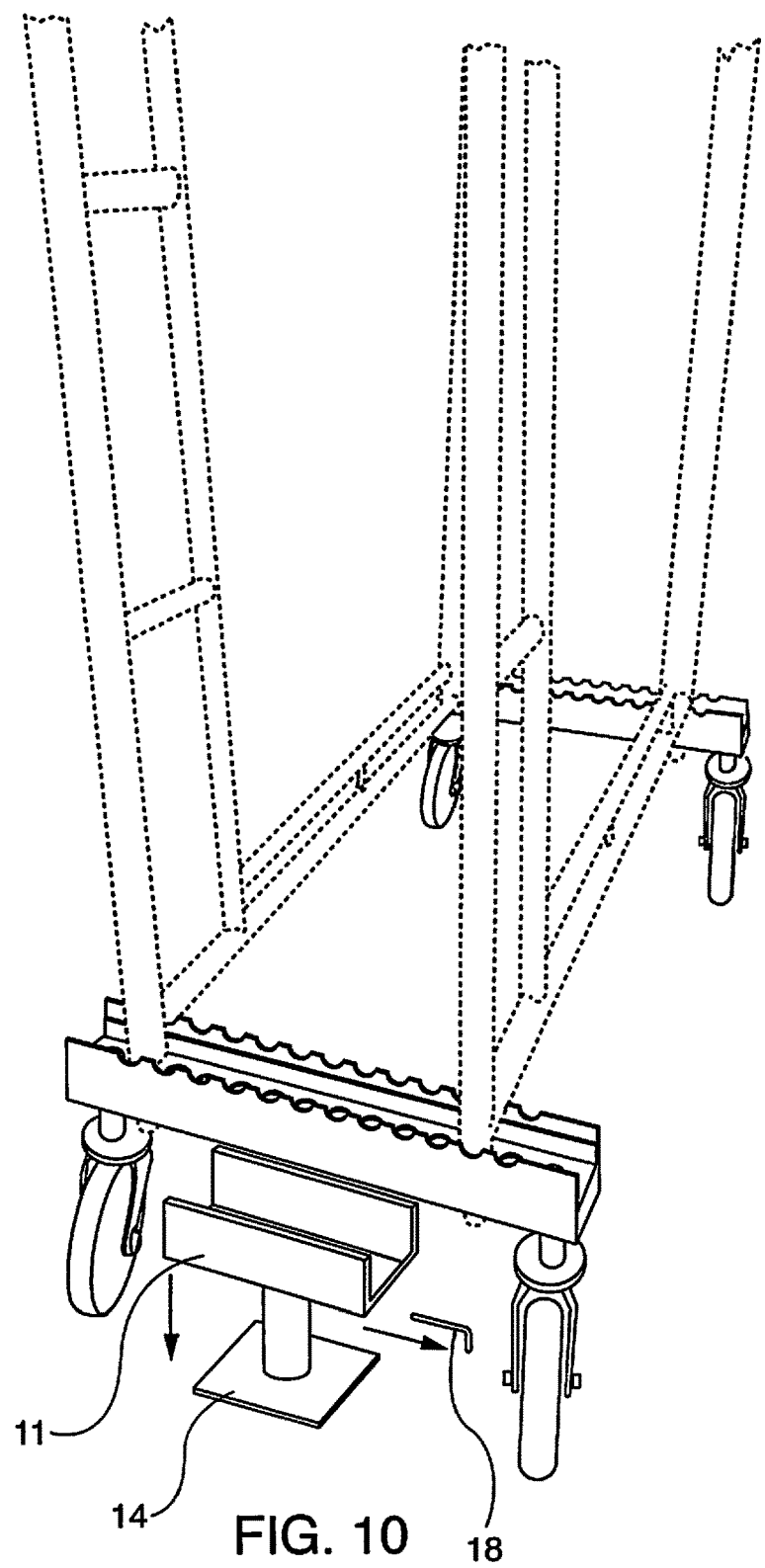
FIG. 10 is an isometric assembly view of the present invention with the channel section tube device dis-engaged.

The front and back of the dolly are capped with typical end pieces 4. FIG. 1 and FIG. 3. Also, the end holes 2' at the front and back of the dolly units have tubes 5 permanently inserted into these end holes which protrude past the bottom plate 1' of the dolly unit 20 to accept swivel-mounted wheels 9 that are employed by the scaffold system when erected. FIG. 2 and FIG. 10. This would typically be an 8 inch swivel caster wheel with brake. A hole 7 perpendicular to the tube 5 diameter is located in tubes 5 to accommodate pins 8 to attach the swivel-mounted wheels 9 to the tubes 5 and therefore to each dolly unit. FIG. 2 and FIG. 3.

In another embodiment of the present invention, a dolly system for the storage and transportation of scaffold frames made up of two separate dolly units is disclosed. FIG. 1. Each dolly unit is fabricated from a rectangular bar of metal or plastic. A channel is inserted along the length of the rectangular bar. Holes are inserted into the bottom flat surface of the channel and through the bottom face of the rectangular bar. Semicircular holes are cut out of the edges of the side walls of the channel. The holes in the bottom of the flat surface of the channel and through the bottom face of the rectangular bar are lined up with the semicircular holes cut out of the edges of the side walls of the channel.

Figure 9:
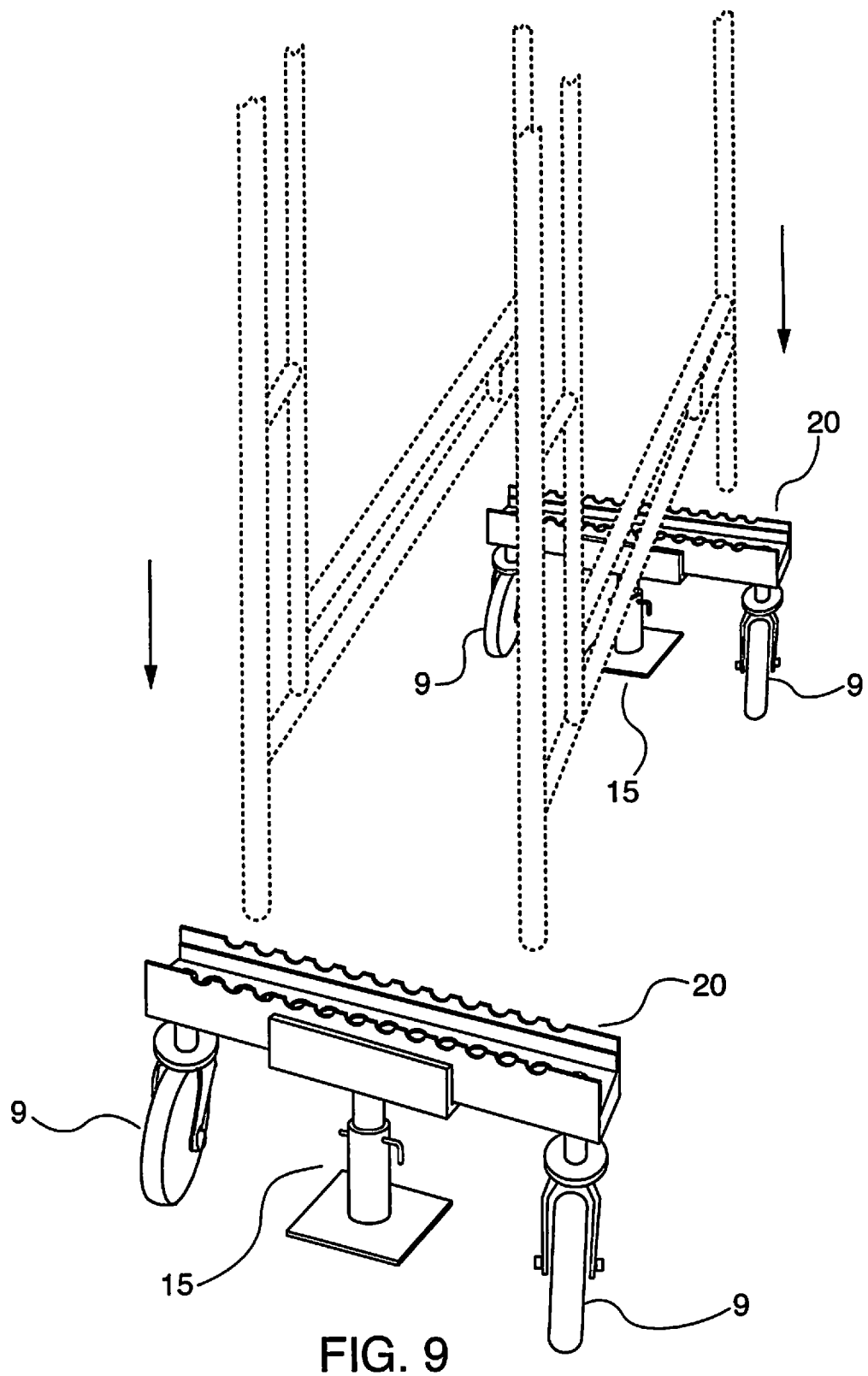
FIG. 9 is an isometric assembly view of the present invention with the channel section tube device engaged.

In use, each of the two scaffold dolly units 20 would be spread apart one from the other in the approximate distance to receive a scaffold frame. FIG. 9. The swivel mounted wheels 9 would be inserted into the mounting tubes 5 located at the front and the back of each dolly unit 20 and secured by pins 8 inserted radially into tubes 5 through the mounting tube of the swivel mounted wheels 9. FIG. 2.

Figure 5:
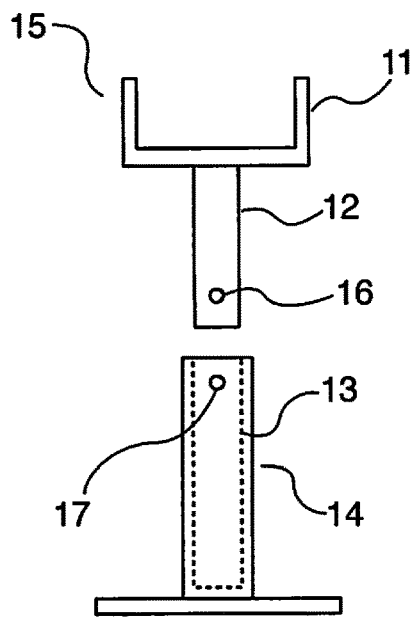
FIG. 5 is a front view of the channel section tube device of the present invention.
Figure 6:
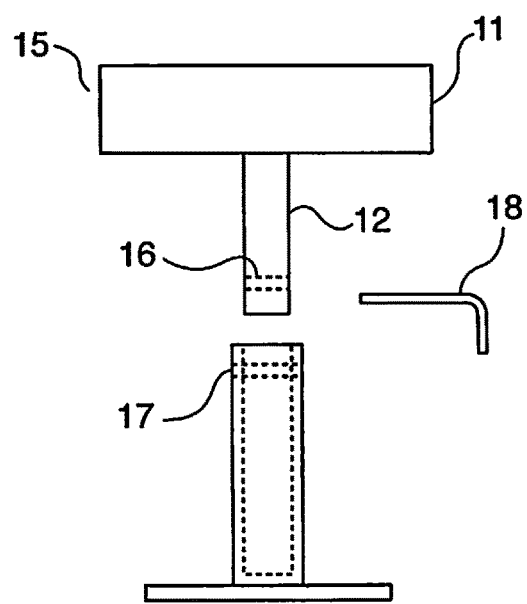
FIG. 6 is a side view of the channel section tube device of the present invention.
Figure 7:
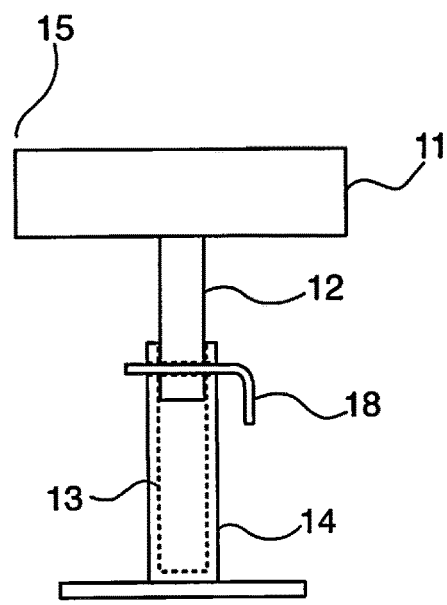
FIG. 7 is a side view of the channel section tube device of the present invention.
Figure 8:
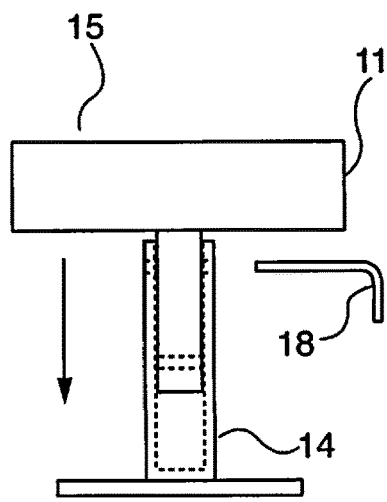
FIG. 8 is a front view of the channel section tube device of the present invention.

A channel segment 11 slightly larger than the width of the rectangle formed by the assembly of the top, bottom and side plates of the dolly unit is formed. This channel segment 11 is attached, by welding or other attachment means, to a tube 12 with an outside diameter slightly smaller than the inside diameter 13 of the tube opening on a typical scaffold base plate 14. This device is referred to as the channel section tube device 15. FIG. 5 and FIG. 7. The channel section tube device 15 is inserted onto a typical scaffold base plate 14. FIG. 8. A hole 16 perpendicular to the diameter of the tube 12 portion of the channel section tube device 15 receives a pin 18 which passes through the hole in the tube 12 of the channel section tube device 15 into the hole 17 in a typical scaffold base plate 14. FIG. 5 and FIG. 6. This prevents the channel section tube device 15 from seating all the way down in the scaffold base plate 14. FIG. 7.

Each channel section tube device 15 is placed into a typical scaffold base plate 14. FIG. 5. The pin 18 inserted into the channel tube assembly tube 12 prevents the channel tube assembly 15 from seating all the way down in the tube of the typical scaffold base plate 14. FIG. 6 and FIG. 7. The swivel mounted wheels 9 are attached to the ends of the dolly units by inserting pins 8 through holes 7 in dolly unit tubes 5. FIG. 2. The dolly units with swivel mounted wheels 9 attached are seated into the channel portion 11 of the channel section tube device 15 which positions the swivel mounted wheels 9 attached to the dolly units 20 such that the swivel mounted wheels 9 are slightly above the floor surface and therefore carry no load in this configuration. FIG. 9. Two scaffold frames are placed at the opposite ends of both dolly units. FIG. 9. At this point, the pin 18 is removed from the channel tube assembly and it falls to seat in the base of the typical scaffold base plate 14. FIG. 8. and FIG. 10. The swivel mounted wheels 9 are engaged with the floor surface and take the load of the dollies. FIG. 10.

Figure 11:
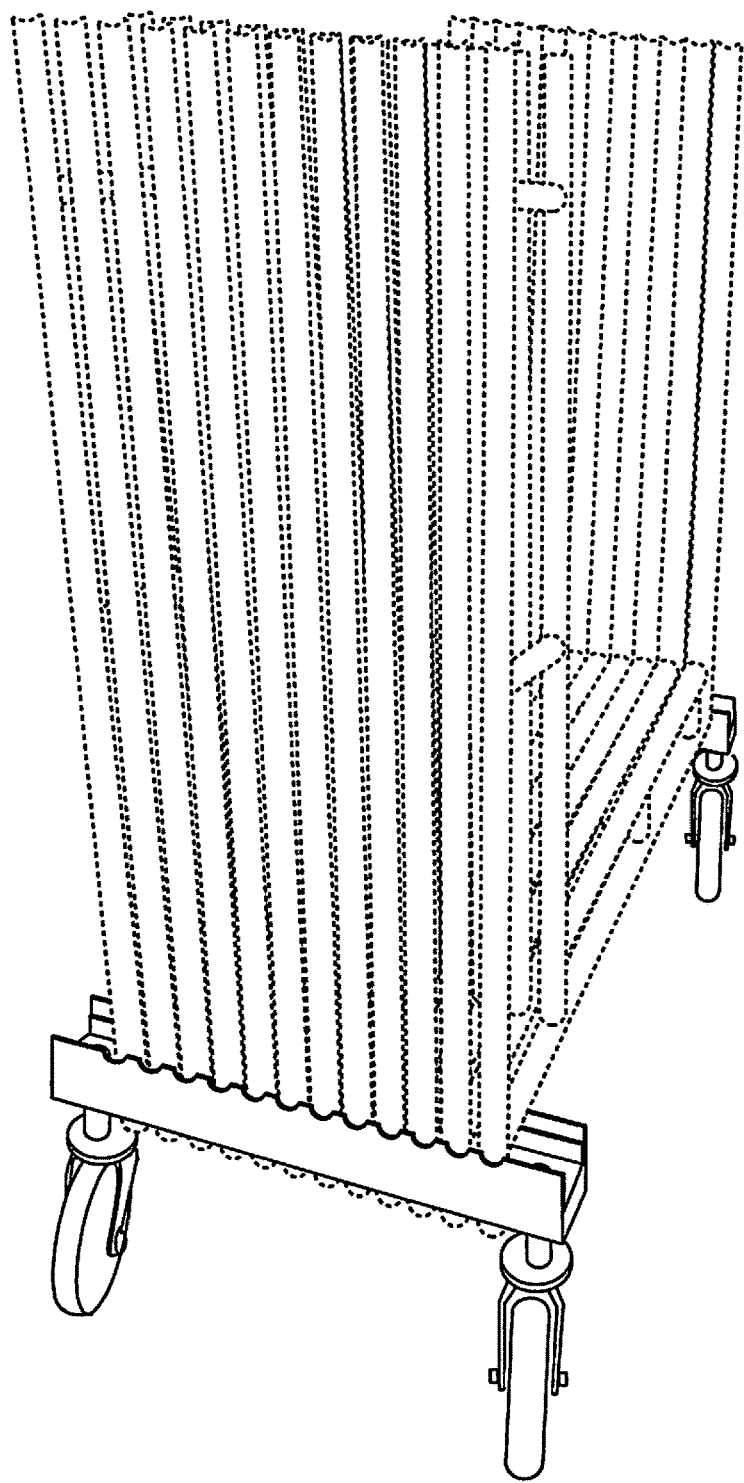
FIG. 11 is an isometric assembly view of the present invention loaded with scaffold frames.

Scaffold frames are loaded into the remaining holes 2 of the dolly units 20 and wheeled around as a unit to the location of intended use on the construction project. FIG. 11. It is important to note that the dollies loaded with scaffold frames—the scaffold dolly assembly—can be rigged to a hoist on a crane and lifted onto any floor of a high rise construction project. Once the loaded scaffold dolly assembly has reached its destination, the scaffold frames can be removed one at a time while the swivel wheels are locked; the dollies will fall over when the last scaffold frame is removed from the scaffold dolly assembly. The swivel wheels 9 are then removed from the dolly units and—if local movement of the assembled scaffold is necessary once erected—inserted into the bottom of the scaffold frame legs while in actual use. Alternatively, the scaffold is secured with scaffold base plates 14 and the dolly units 20 and swivel wheels 9 are set aside until the assembled scaffold is disassembled and placed on the scaffold dolly assembly for transport to another location.

The invention claimed is:

1. A method for loading scaffold frames onto a pair of devices for loading, storing and transporting scaffold frame members, comprising:

Providing two scaffold dolly members each having an elongate rectangular member made up of an elongate rectangular member having a top surface, bottom surface, side surfaces, front and back surfaces and a front end and a back end, a channel section disposed on top of the top surface and front and back surfaces along the length of the elongate rectangular member with side walls parallel to the side surfaces of the elongate rectangular member and an internal flat section parallel to the bottom surface of the elongate rectangular member, a plurality of communicating semi-circular cut outs along the top edges of the side walls of the channel section, a plurality of holes distributed along the length of the top surface of the elongate rectangular member which pass through the bottom surface of the elongate rectangular member and pass through the internal flat section of the channel section, the plurality of holes distributed along the length of the top surface of the elongate rectangular member which pass through the bottom surface of the elongate rectangular member and pass through the internal flat section of the channel section corresponding to the plurality of communicating semi-circular cut outs along the top edges of the side walls of the channel section, receiver tubes protruding from the front end and back end bottom surface holes and passing through and communicating with both the front end and back end internal flat section holes of the channel section and the front end and back end holes of the top surface of the elongate rectangular member adapted adjustably receive swivel mounted wheels, swivel mounted wheels adjustably inserted into the receiver tubes and providing two channel section tube devices to secure each of the scaffold dolly members during loading, each device having a horizontal channel section with a flat base section having an inner flat base section face and outer flat base section face and two opposing side wall sections with inner and outer faces oriented perpendicular to the flat base section, a vertical tube section with a top end and a bottom end, the top end of the vertical tube section adapted to be attached to the outer flat base section face of the horizontal channel section, the area bounded by the inner flat base section face and the inner side wall faces of the opposing side wall sections adapted to accept an elongate rectangular member, the bottom end of the vertical tube section being adapted to adjustably fit into the tube section of a scaffold base plate:

inserting the swivel mounted wheels into the receiver tubes located at the front end and back end of each scaffold dolly member;

inserting pins through the radial holes in the swivel mounted wheel mounting tubes and the receiver tubes in the scaffold dolly members;

inserting pins through the radial holes in each channel section tube device and a scaffold base plate receiver tube;

placing each scaffold dolly member on a channel section tube device supported in a scaffold base plate;

loading scaffold frames into the corresponding holes located at the front end and back end of each scaffold dolly member supported in the channel section tube devices supported in scaffold base plates;

removing the pins from each channel section tube device supported in scaffold base plates;

loading the remaining scaffold frames into the plurality of corresponding holes in the scaffold dolly members supported by swivel mounted wheels;

transporting or storing the scaffold dolly members loaded with scaffold frames on swivel mounted wheels.

2. A pair of scaffold dolly members, each comprising:
an elongate rectangular member having a top surface, bottom surface, side surfaces, front and back surfaces and a front end and a back end;

a channel section disposed on top of the top surface and front and back surfaces along the length of the elongate rectangular member with side walls parallel to the side surfaces of the elongate rectangular member and an internal flat section parallel to the bottom surface of the elongate rectangular member;

a plurality of communicating semi-circular cut outs along the top edges of the side walls of the channel section;

a plurality of holes distributed along the length of the top surface of the elongate rectangular member which pass through the bottom surface of the elongate rectangular member and pass through the internal flat section of the channel section;

the plurality of holes distributed along the length of the top surface of the elongate rectangular member which pass through the bottom surface of the elongate rectangular member and pass through the internal flat section of the channel section corresponding to the plurality of communicating semi-circular cut outs along the top edges of the side walls of the channel section;

receiver tubes protruding from the front end and back end bottom surface holes of the elongate rectangular member and passing through and communicating with both the front end and back end internal flat section holes of the channel section and the front end and back end holes of the top surface of the elongate rectangular member adapted to adjustably receive swivel mounted wheels;

swivel mounted wheels adjustably inserted into the receiver tubes.

3. The scaffold dolly members in claim 2, wherein the swivel mounted wheels are 8 inch swivel caster wheels with a brake.

4. The scaffold dolly members in claim 2, wherein the number of communicating holes distributed along the length of the top surface of the elongate rectangular member which pass through the bottom surface of the elongate rectangular member and pass through the internal flat section of the channel section corresponding to the plurality of communicating semi-circular cut outs along the top edges of the side surfaces and side walls of the channel section is 12.

5. The scaffold dolly members in claim 3, wherein the number of communicating holes distributed along the length of the top surface of the elongate rectangular member which pass through the bottom surface of the elongate rectangular member and pass through the internal flat section of the channel section corresponding to the plurality of communicating semi-circular cut outs along the top edges of the side surfaces and side walls of the channel section is 12.

* * * * *